(12) United States Patent
Heo et al.

(10) Patent No.: US 12,276,774 B2
(45) Date of Patent: Apr. 15, 2025

(54) POLYESTER PROTECTION FILM FOR FLEXIBLE DISPLAY DEVICE

(71) Applicant: SK microworks Co., Ltd., Gyeonggi-do (KR)

(72) Inventors: Young Min Heo, Gyeonggi-do (KR); Gun Uk Kim, Gyeonggi-do (KR); Sechul Lee, Gyeonggi-do (KR); Jin-Seok Park, Gyeonggi-do (KR)

(73) Assignee: SK MICROWORKS CO., LTD., Gyeonggi-do (KR)

( * ) Notice: Subject to any disclaimer, the term of this patent is extended or adjusted under 35 U.S.C. 154(b) by 594 days.

(21) Appl. No.: 17/618,404

(22) PCT Filed: Sep. 4, 2020

(86) PCT No.: PCT/KR2020/011932
§ 371 (c)(1),
(2) Date: Dec. 10, 2021

(87) PCT Pub. No.: WO2021/045557
PCT Pub. Date: Mar. 11, 2021

(65) Prior Publication Data
US 2022/0276411 A1 Sep. 1, 2022

(30) Foreign Application Priority Data
Sep. 5, 2019 (KR) .................. 10-2019-0110166

(51) Int. Cl.
*G02B 1/14* (2015.01)
*B32B 7/023* (2019.01)
*G02B 1/11* (2015.01)

(52) U.S. Cl.
CPC ............ *G02B 1/14* (2015.01); *B32B 7/023* (2019.01); *G02B 1/11* (2013.01)

(58) Field of Classification Search
None
See application file for complete search history.

(56) References Cited

U.S. PATENT DOCUMENTS

2019/0154884 A1   5/2019   Kim et al.

FOREIGN PATENT DOCUMENTS

| JP | 2017-146353 A | 8/2017 |
|---|---|---|
| KR | 10-2015-0127455 A | 11/2015 |
| KR | 10-2016-0105667 A | 9/2016 |
| KR | 10-2017-0121522 A | 11/2017 |
| KR | 10-2018-0047567 A | 5/2018 |
| KR | 10-2018-0084775 A | 7/2018 |
| KR | 10-2019-0001302 A | 1/2019 |
| KR | 10-2019-0048916 A | 5/2019 |

OTHER PUBLICATIONS

Office Action issued by the Korean Patent Office on Jan. 13, 2021.
Office Action for Korean Patent Application No. 10-2021-0032762 issued by the Korean Patent Office on Oct. 21, 2022.

*Primary Examiner* — Thanh Nhan P Nguyen
(74) *Attorney, Agent, or Firm* — IP & T GROUP LLP

(57) ABSTRACT

A protection film according to an embodiment implements a very low reflectivity through a multilayer structure of which the refractive index is controlled and does not cause whitening and cracking to occur even in the case of frequent bending or folding thereof. Accordingly, the protection film is applied to a flexible display device, and especially to a cover of a foldable display device, thereby showing excellent optical and mechanical characteristics.

8 Claims, 2 Drawing Sheets

POLYESTER PROTECTION FILM FOR FLEXIBLE DISPLAY DEVICE

This application is a national stage application of PCT/KR2020/011932 filed on Sep. 4, 2020, which claims priority of Korean patent application number 10-2019-0110166 filed on Sep. 5, 2019. The disclosure of each of the foregoing applications is incorporated herein by reference in its entirety.

TECHNICAL FIELD

Embodiments relate to a polyester protection film for flexible display devices. More specifically, the embodiments relate to a protection film, in which its modulus at room temperature is controlled, and a laminate and a flexible display device comprising the same.

BACKGROUND ART

Display technologies continue to develop driven by the demand in tandem with the development in IT devices. Technologies on curved displays and bent displays have already been commercialized. In recent years, flexible display devices that can be flexibly bent or folded in response to an external force are preferred in the field of mobile devices that require large screens and portability at the same time. In particular, a foldable display device has the great advantages that it is folded to a small size to enhance its portability when not in use, and it is unfolded to form a large screen when in use.

Figure 4:
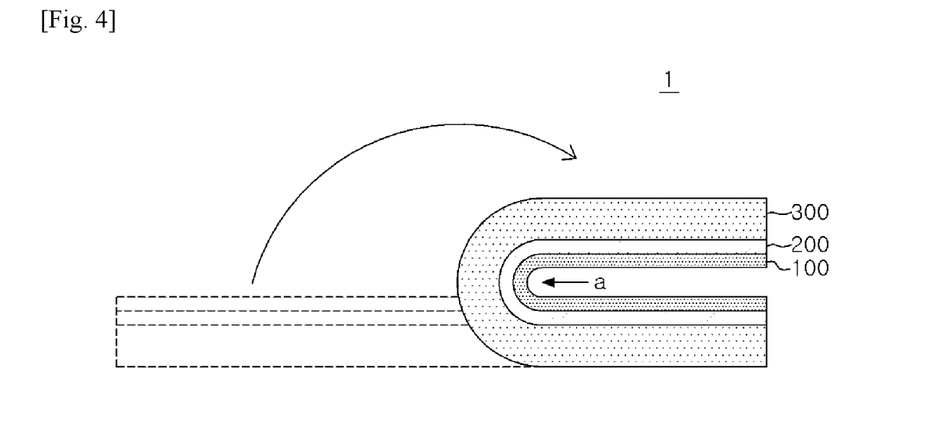
FIG. 4 shows a cross-sectional view of an in-folding type flexible display device.
Figure 5:
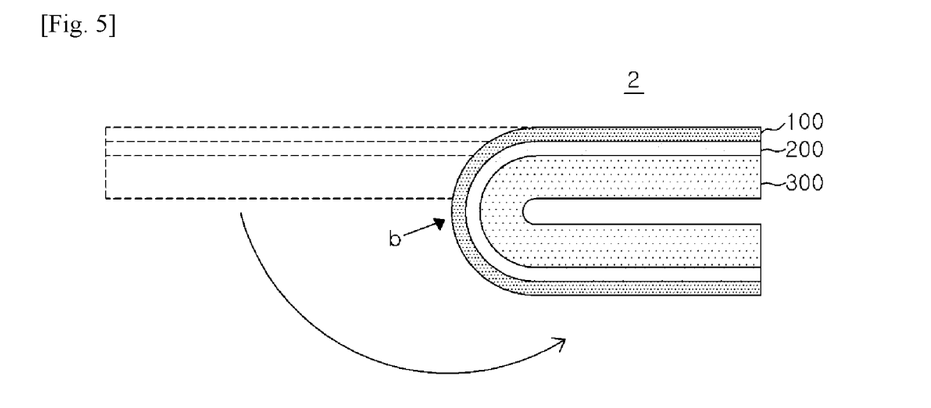
FIG. 5 shows a cross-sectional view of an out-folding type flexible display device.

Referring to FIGS. 4 and 5, such foldable display devices are being developed as an in-folding type (1) in which a screen is positioned inside the folding direction and an out-folding type (2) in which a screen is positioned outside the folding direction. As a transparent substrate (200) applied as a cover window of these foldable display devices, for example, a polyimide-based film is used in the in-folding type, and ultra-thin glass (UTG) is used in the out-folding type. In addition, a protection film (100) is applied to the surface of the transparent substrate (200) for the purposes of shock absorption, scattering prevention, and scratch prevention. Recently, an attempt has been made to prepare a protection film for a flexible display device using a polyester resin.

In addition, in recent years, various surface treatment techniques have been developed to minimize the reflectance of films attached to the cover of a display device in order to prevent the visibility from being lowered by the reflection of external light from the front side of the display device.

DISCLOSURE OF INVENTION

Technical Problem

In a material applied to flexible display devices, it is as important as flexibility that the original characteristics are not deteriorated despite frequent bending or folding. When a conventional material is completely folded and then unfolded, there remains a mark, and it is almost impossible to return to the original state. Thus, the development of materials applied to flexible display devices should be accompanied by research to overcome this limitation.

Specifically, whitening or cracks are generated in the protection film (100) or the like, which deteriorates the characteristics thereof, due to the deformation caused by compressive stress applied to the point (a) of small inward folding in the in-folding type (1) as shown in FIG. 4 and due to the deformation caused by tensile stress applied to the point (b) of large outward folding in the out-folding type (2) as shown in FIG. 5. Such whitening and cracks can generally be solved when the modulus of the protection film is small at room temperature. Polyester resins such as polyethylene terephthalate (PET) usually have a large modulus at room temperature, so that they have a problem in that whitening and cracks are easily generated when applied to flexible display devices.

Meanwhile, there is known a technique of forming various functional layers on the surface of a protection film in order to lower the reflectance of the protection film adopted in a display device. However, the newly formed functional layers cause optical interference with the existing film layers, which makes it difficult to control the reflectance or impairs the optical characteristics. In addition, a polyester film made of, e.g., polyethylene terephthalate has a very large birefringence. Thus, the polarizing state is distorted between the polarizer and the liquid crystal, resulting in rainbow stains or the like, which significantly impairs the visibility.

As a result of the research conducted by the present inventors to solve these problems, it has been discovered that a multilayer structure combined with a refractive index may be designed, and the modulus of the film may be adjusted, to enhance its optical and mechanical properties.

Accordingly, the embodiments aim to provide a protection film that does not cause whitening and cracks despite frequent bending or folding while achieving a very low reflectance through a multilayer structure with a controlled refractive index, and a laminate and a flexible display device comprising the same.

Solution to Problem

According to an embodiment, there is provided a protection film, which comprises a base layer comprising a polyester resin; and a primer layer disposed on the base layer, wherein the protection film has a reflectance of 5% or less for light having a wavelength of 550 nm, the strain until whitening occurs in the base layer is 10% or more, and the following Relationship (1) is satisfied.

$$0.7 \leq n2/n1 \leq 1.0 \tag{1}$$

In the above relationship, n1 and n2 refer to the refractive indices of the base layer and the primer layer, respectively.

According to another embodiment, there is provided a laminate, which comprises a transparent cover for a flexible display device; and a protection film comprising a base layer disposed on the transparent cover and comprising a polyester resin; and a primer layer disposed on the base layer, wherein the protection film has a reflectance of 5% or less for light having a wavelength of 550 nm, the strain until whitening occurs in the transparent cover and the base layer is 10% or more, and the following Relationship (1) is satisfied.

$$0.7 \leq n2/n1 \leq 1.0 \tag{1}$$

In the above relationship, n1 and n2 refer to the refractive indices of the base layer and the primer layer, respectively.

Advantageous Effects of Invention

The protection film according to the embodiment in which the refractive indices between the constituent layers are combined has a very low reflectance, so that its visibility is not impaired by external light.

In addition, in the protection film according to the embodiment, the modulus at room temperature is controlled, so that whitening and cracking can be remarkably suppressed despite frequent bending or folding.

By virtue of these features, the protection film can be applied to a cover of a flexible display device, in particular, a foldable display device to exhibit excellent optical and mechanical properties.

<Explanation of Reference Numerals>

| | |
|---|---|
| 1: in-folding type flexible display device | |
| 2: out-folding type flexible display device | |
| 10: laminate | 100: protection film |
| 110: base layer | 102: primer layer |
| 130: hard coating layer | 140: first refractive layer |
| 150: second refractive layer | 200: transparent cover |
| 300: body of a flexible display device | a, b: folding points |

BEST MODE FOR CARRYING OUT THE INVENTION

Throughout the description of the embodiments, in the case where each film, panel, or layer is mentioned to be formed "on" or "under" another film, panel, or layer, it means not only that one element is directly formed on or under another element, but also that one element is indirectly formed on or under another element with other element(s) interposed between them.

In addition, for the sake of description, the sizes of individual elements in the appended drawings may be exaggeratingly depicted and do not indicate the actual sizes.

In addition, all numbers expressing the physical properties, dimensions, and the like of components used herein are to be understood as being modified by the term "about" unless otherwise indicated.

[Protection Film]

Figure 1:
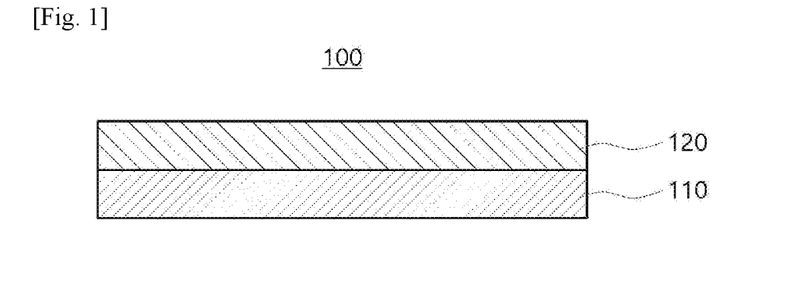
FIG. 1 shows a cross-sectional view of a protection film provided with a base layer and a primer layer.

FIG. 1 is a cross-sectional view of a protection film (100) according to an embodiment and illustrates a protection film comprising a base layer (110) and a primer layer (120).

The protection film may further comprise one or more additional coating layers other than the primer layer (120) on the base layer (110).

For example, the protection film may further comprise a functional coating layer for hardness enhancement, antistatic, scattering prevention, refractive index adjustment, surface protection, or the like.

Figure 2:
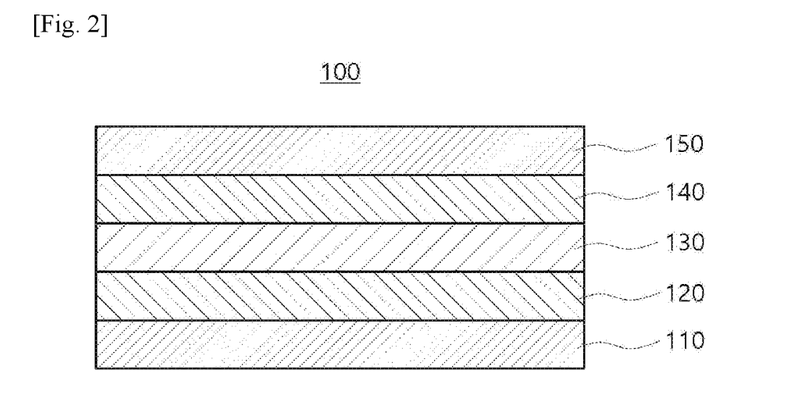
FIG. 2 shows a cross-sectional view of a protection film provided with a base layer, a primer layer, a hard coating layer, a first refractive layer, and a second refractive layer.

Referring to FIG. 2, the protection film (100) may further comprise a hard coating layer (130), a first refractive layer (140), and a second refractive layer (150) disposed on the primer layer (120).

In addition, the protection film (100) may further comprise a coating layer having an antistatic or anti-sparkling function disposed on the primer layer (120).

Retardations and Thicknesses of the Respective Layers

The polyester film according to an embodiment satisfies the following Relationship (1).

$$0.7 \leq n2/n1 \leq 1.0 \tag{1}$$

In the above relationship, n1 and n2 refer to the refractive indices of the base layer and the primer layer, respectively.

Specifically, the n2/n1 ratio may be 0.8 to 1.0, 0.9 to 1.0, 0.7 to 0.9, 0.7 to 0.8, or 0.8 to 0.9. Alternatively, the n2/n1 ratio may be 0.7 or more to less than 1.0, 0.8 or more to less than 1.0, or 0.9 or more to less than 1.0.

According to another embodiment, the protection film may further satisfy the following Relationship (2).

$$0 \leq n1-n2 \leq 0.10 \tag{2}$$

In the above relationship, n1 and n2 refer to the refractive indices of the base layer and the primer layer, respectively.

According to still another embodiment, the protection film may further comprise a hard coating layer disposed on the primer layer and further satisfy the following Relationships (3) to (5).

$$n3 < n2 < n1 \tag{3}$$

$$0.05 \leq n1-n3 \leq 0.20 \tag{4}$$

$$0 < n2-n3 \leq 0.13 \tag{5}$$

In the above relationships, n1, n2, and n3 refer to the refractive indices of the base layer, the primer layer, and the hard coating layer, respectively.

The refractive index (n1) of the base layer may be 1.61 to 1.69. Alternatively, the refractive index (n1) of the base layer may be 1.63 to 1.68, 1.63 to 1.67, or 1.63 to 1.66.

The refractive index (n2) of the primer layer may be 1.50 to 1.68. Alternatively, the refractive index (n2) of the primer layer may be 1.54 to 1.63, 1.54 to 1.58, 1.54 to 1.62, 1.55 to 1.61, or 1.58 to 1.63.

The refractive index (n3) of the hard coating layer may be 1.40 to 1.67. Alternatively, the refractive index (n3) of the hard coating layer may be 1.45 to 1.60 or 1.50 to 1.53.

The base layer may have a thickness of 10 μm to 100 μm. Alternatively, the thickness of the base layer may be 10 μm to 80 μm, 20 μm to 60 μm, or 40 μm to 60 μm.

The primer layer may have a thickness of 10 nm to 200 nm. Alternatively, the thickness of the primer layer may be 50 nm to 120 nm, 80 nm to 95 nm, 80 nm to 90 nm, or 80 nm to 85 nm.

The hard coating layer may have a thickness of 0.5 μm to 100 μm. Alternatively, the thickness of the hard coating layer may be 1 μm to 10 μm, 1 μm to 8 μm, 1 μm to 5 μm, or 1.5 μm to 3.5 μm.

According to a specific example, the base layer may have a refractive index (n1) of 1.61 to 1.69 and a thickness of 20 μm to 60 μm, the primer layer may have a refractive index (n2) of 1.54 to 1.63 and a thickness of 20 nm to 120 nm, and the hard coating layer may have a refractive index (n3) of 1.50 to 1.53 and a thickness of 1 μm to 5 μm.

Within the above preferred ranges, it may be more advantageous for suppressing the occurrence of rainbow stains and enhancing the visibility when it is applied to an optical component for a display device or the like.

According to still another embodiment, the protection film may further comprise a first refractive layer disposed on the hard coating layer and a second refractive layer disposed on the first refractive layer and further satisfy the following Relationships (6) and (7).

$$n5<n3<n2<n1<n4 \quad (6)$$

$$0.25 \leq n4-n5 \leq 0.60 \quad (7)$$

In the above relationships, n1, n2, n3, n4, and n5 refer to the refractive indices of the base layer, the primer layer, the hard coating layer, the first refractive layer, and the second refractive layer, respectively.

The refractive index (n4) of the first refractive layer may be 1.60 to 1.80, 1.60 to 1.75, 1.70 to 1.80, or 1.70 to 1.75.

In addition, the refractive index (n5) of the second refractive layer may be 1.10 to 1.40 or 1.25 to 1.35.

In addition, the difference (n1−n3) in the refractive indices between the base layer and the hard coating layer may be 0.05 to 0.20, 0.09 to 0.16, 0.05 to 0.15, or 0.10 to 0.20.

In addition, the difference (n4-n5) in the refractive indices between the first refractive layer and the second refractive layer may be 0.30 to 0.60, 0.40 to 0.50, 0.30 to 0.50, or 0.40 to 0.60.

The thickness of the first refractive layer may be 5 nm to 800 nm, 60 nm to 800 nm, 30 nm to 500 nm, 50 nm to 300 nm, 50 nm to 200 nm, 5 nm to 150 nm, 10 nm to 130 nm, or 20 nm to 100 nm.

The thickness of the second refractive layer may be 10 nm to 1 μm, 80 nm to 120 nm, 80 nm to 100 nm, 90 nm to 110 nm, or 100 nm to 120 nm.

According to a more specific example, the base layer may have a refractive index (n1) of 1.61 to 1.69 and a thickness of 20 μm to 60 μm, the primer layer may have a refractive index (n2) of 1.54 to 1.63 and a thickness of 20 nm to 120 nm, the hard coating layer may have a refractive index (n3) of 1.50 to 1.53 and a thickness of 1 μm to 5 μm, the first refractive layer may have a refractive index (n4) of 1.60 to 1.75 and a thickness of 60 nm to 800 nm, and the second refractive layer may have a refractive index (n5) of 1.25 to 1.35 and a thickness of 80 nm to 120 nm.

Within the above preferred ranges, the reflection may be low and other optical characteristics can be enhanced when it is applied to an optical component for a display device or the like.

Properties of the Base Layer

The base layer may have a strain of 10% or more, 12% or more, 15% or more, or 20% or more, until whitening occurs. Within the above range, it can be advantageously applied to a flexible display device since no whitening occurs despite the deformation of the film upon frequent folding. The strain refers to the ratio of a changed dimension to an initial dimension of a film. Here, the changed dimension may be an increased dimension or a decreased dimension.

The base layer may withstand 100 times or more, 1,000 times or more, 10,000 times or more, 50,000 times or more, 100,000 times or more, 150,000 times or more, or 200,000 times or more of repeated folding at an angle of 135° until it is broken. Within the above preferred range, it can be advantageously applied to a flexible display device since it is not broken even upon frequent folding.

In addition, the base layer may have an elongation retention rate of 80% or more, 85% or more, or 90% or more, when treated at 1.2 atm and 120° C. for 72 hours.

In addition, the base layer may have a moisture permeability of 10 g/m² day to 100 g/m² day, 10 g/m² day to 50 g/m² day, or 10 g/m² day to 30 g/m² day.

In addition, the base layer may have a transmittance of 10% or less, 5% or less, or 3% or less, at a wavelength of 380 nm.

The base layer may have a crystallinity of 35% to 55%. Within the above preferred range, excessive crystallization can be prevented while excellent mechanical properties in terms of tensile strength and the like are excellent.

In addition, the base layer may have a surface hardness of 5B or higher, 1H or higher, 2H or higher, or 3H or higher, which may be a surface hardness at the time of hard coating treatment of 2 μm to 4 μm in thickness.

The base layer may have a ratio (s2/s1) of the thermal shrinkage rate (s2) in the second direction to the thermal shrinkage rate (s1) in the first direction of 1 to 10 under the conditions of 85° C. and 24 hours. Specifically, the ratio (s2/s1) of the thermal shrinkage rates may be 1.4 to 9, 1.5 to 8, or 1.6 to 7.

In addition, s1 may be 1% or less, 0.8% or less, 0.6% or less, 0.4% or less, or 0.2% or less. For example, s1 may be 0% to 1.0%, 0% to 0.8%, 0% to 0.6%, 0% to 0.4%, or 0% to 0.2%.

In addition, s2 may be 3% or less, 2% or less, 1.5% or less, 1.2% or less, 1% or less, 0.8% or less, or 0.7% or less. For example, s2 may be 0.2% to 3%, 0.3% to 2%, 0.4% to 1%, or 0.5% to 0.8%.

Since the base layer has the above-described thermal shrinkage characteristics, lifting due to shrinkage may not occur under high-temperature conditions. Accordingly, it is possible to prevent stains, glitter, delamination between layers, cracks, and the like in advance.

Modulus of the Base Layer

The base layer has a low level of moduli (m1, m2) in a first direction and in a second direction perpendicular to each other in the plane at 25° C.

In particular, the base layer has a small difference between m1 and m2 of the film (|m1−m2|) at 25° C. That is, the m2/m1 ratio may be close to 1 at 25° C.

As such, the protection film can be advantageously applied to a flexible display device since no whitening occurs despite frequent bending or folding.

Both m1 and m2 may be 5 GPa or less, 4.5 GPa or less, 4 GPa or less, 3.5 GPa or less, or 3 GPa or less at 25° C. Specifically, both m1 and m2 may be 2 GPa to 5 GPa, 2.5 GPa to 5 GPa, 2 GPa to 4.5 GPa, or 2 GPa to 4 GPa at 25° C.

In addition, the difference between m1 and m2 (|m1−m2|) may be 1.0 GPa or less at 25° C. Specifically, the difference between m1 and m2 (|m1−m2|) may be 0.7 GPa or less, 0.5 GPa or less, 0.3 GPa or less, 0.2 GPa or less, or 0.1 GPa or less at 25° C.

In addition, the m2/m1 ratio may be 0.7 to 1.3, 0.8 to 1.2, or 0.9 to 1.1 at 25° C.

As an example, the first direction may be the transverse direction (TD) of the film, and the second direction may be the longitudinal direction (MD) of the film.

In such an event, the m2/m1 ratio may be 0.7 to 1.0, 0.8 to 1.0, 0.9 to 1.0, 0.7 to 0.9, 0.7 to 0.8, or 0.8 to 0.9 at 25° C.

Alternatively, the m2/m1 ratio may be 1.0 to 1.3, 1.0 to 1.2, 1.0 to 1.1, 1.1 to 1.3, 1.2 to 1.3, or 1.1 to 1.2 at 25° C.

The protection film can be applied to a cover of a flexible display device, in particular, a foldable display device by virtue of these characteristics. It is possible to prevent deterioration in the characteristics by the deformation occurring at the point of small inward folding in an in-folding type, as well as by the deformation occurring at the point of large outward folding in an out-folding type.

In addition, both m1 and m2 may be 3.5 GPa or less, 3.0 GPa or less, 2.5 GPa or less, 2.0 GPa or less, or 1.5 GPa or less at 85° C.

In addition, m1 may have a difference of 1 GPa to 4 GPa, a difference of 2 GPa to 4 GPa, or a difference of 1 GPa to 3 GPa from each other at 25° C. and 85° C. In addition, m2 may have a difference of 1 GPa to 4 GPa, a difference of 2 GPa to 4 GPa, or a difference of 1 GPa to 3 GPa from each other at 25° C. and 85° C.

As a specific example, the base layer, when a first direction and a second direction perpendicular to each other in the plane are defined, may have a ratio (m2/m1) of the modulus (m2) in the second direction to the modulus (m1) in the first direction of 0.7 to 1.3 at 25° C. Here, both m1 and m2 may be 4.5 GPa or less at 25° C. In addition, both m1 and m2 may be 2.5 GPa or less at 85° C.

Retardation of the Base Layer

The base layer may have an in-plane retardation (Ro) of 600 nm or less, 500 nm or less, 400 nm or less, 300 nm or less, or 200 nm or less. Within the above preferred range, it is possible to minimize the occurrence of rainbow stains.

Meanwhile, the lower limit of the in-plane retardation of the base layer may be 0 nm. Alternatively, the lower limit of the in-plane retardation (Ro) may be 10 nm or more, 30 nm or more, or 50 nm or more in order to balance the optical characteristics and the mechanical properties.

In addition, the base layer may have a thickness direction retardation (Rth) of 4,000 nm or more, 5,000 nm or more, or 5,500 nm or more.

The thickness direction retardation may be a value measured based on a thickness of 40 μm to 50 μm. Within the above preferred range, the degree of orientation of molecules is high, which promotes the crystallization and is preferable from the viewpoint of mechanical properties. In addition, as the thickness direction retardation (Rth) is larger, the ratio (Rth/Ro) of the thickness direction retardation (Rth) to the in-plane retardation (Ro) becomes larger, thereby effectively suppressing rainbow stains.

Meanwhile, the upper limit of the thickness direction retardation (Rth) may be 16,000 nm or less, 15,000 nm or less, or 14,000 nm or less in view of the thickness limit and cost for eliminating rainbow stains in the base layer.

Here, the in-plane retardation (Ro) is a parameter defined by a product ($\Delta nxy \times d$) of anisotropy ($\Delta nxy = |nx-ny|$) of refractive indices of two mutually perpendicular axes on a film and the film thickness (d), which is a measure of the degree of optical isotropy and anisotropy.

In addition, the thickness direction retardation is a parameter defined by a product of an average of the two birefringences $\Delta nxz$ ($=|nx-nz|$) and $\Delta nyz$ ($=|ny-nz|$) observed on a cross-section in the film thickness direction and the film thickness (d).

In addition, the base layer may have a ratio (Rth/Ro) of the thickness direction retardation (Rth) to the in-plane retardation (Ro) of 10 or more, 15 or more, or 20 or more. The smaller the in-plane retardation (Ro) and the larger the thickness direction retardation (Rth), the more advantageous for preventing rainbow stains. Thus, it is preferable that the ratio (Rth/Ro) of the two values is maintained to be larger.

Composition of the Base Layer

The base layer comprises a polyester resin.

The polyester resin may be a homopolymer resin or a copolymer resin in which a dicarboxylic acid and a diol are polycondensed. In addition, the polyester resin may be a blend resin in which the homopolymer resins or the copolymer resins are mixed.

Examples of the dicarboxylic acid include terephthalic acid, isophthalic acid, orthophthalic acid, 2,5-naphthalene dicarboxylic acid, 2,6-naphthalene dicarboxylic acid, 1,4-naphthalene dicarboxylic acid, 1,5-naphthalene dicarboxylic acid, diphenylcarboxylic acid, diphenoxyethane dicarboxylic acid, diphenylsulfonic acid, anthracenedicarboxylic acid, 1,3-cyclopentanedicarboxylic acid, 1,3-cyclohexanedicarboxylic acid, 1,4-cyclohexanedicarboxylic acid, hexahydroterephthalic acid, hexahydroisophthalic acid, malonic acid, dimethyl malonic acid, succinic acid, 3,3-diethyl succinic acid, glutaric acid, 2,2-dimethylglutaric acid, adipic acid, 2-methyladipic acid, pimelic acid, azelaic acid, sebacic acid, suberic acid, dodecadicarboxylic acid, and the like.

In addition, examples of the diol include ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl)propane, bis(4-hydroxyphenyl) sulfone, and the like.

Preferably, the polyester resin may be an aromatic polyester resin having excellent crystallinity. For example, it may have a polyethylene terephthalate (PET) resin as a main component.

As an example, the base layer may comprise a polyester resin, specifically, a PET resin, in an amount of at least about 85% by weight, more specifically, at least 90% by weight, at least 95% by weight, or at least 99% by weight. As another example, the base layer may further comprise a polyester resin other than the PET resin. Specifically, the base layer may further comprise up to about 15% by weight of a polyethylene naphthalate (PEN) resin. More specifically, the base layer may further comprise a PEN resin in an amount of about 0.1% by weight to 10% by weight or about 0.1% by weight to 5% by weight.

The base layer is preferably a stretched film due to its high crystallinity and excellent mechanical properties. Specifically, the base layer may be a biaxially stretched polyester film. For example, it may be a film stretched at a stretching ratio of 2.0 to 5.0 in the longitudinal direction (MD) and in the transverse direction (TD), respectively.

In addition, the base layer can have increased crystallinity and enhanced mechanical properties in terms of tensile strength and the like in the process of preparing the same through heating, stretching, and the like as it comprises a polyester as a main component.

Primer Layer

The primer layer serves to enhance the adhesion between the base layer and other functional coating layers.

The primer layer may be formed from a coating composition that comprises a thermosetting resin. For example, the coating composition may comprise a polyester-based resin, a polyurethane-based resin, or a mixture thereof.

The primer layer may be formed from a composition obtained by mixing and dispersing a raw material resin and, as required, a photoinitiator and other additives in a solvent. Water may be preferably used as the solvent. Thus, the composition for the primer coating layer may be prepared in the form of an aqueous coating liquid such as an aqueous solution, an aqueous dispersion, or an emulsion. In addition, an organic solvent may be used in a small amount.

For example, the composition for the primer layer preferably has a solids content of 3% by weight to 20% by weight or 4% by weight to 10% by weight.

Hard Coating Layer

The hard coating layer serves to enhance the hardness of the surface of the protection film.

As an example, the one or more coating layers may comprise a hard coating layer having a thickness of 2 μm to 4 μm, and the protection film may have a surface hardness of 2H or higher.

The hard coating layer may comprise a photocurable resin. Examples of the photocurable resin include compounds having one or two or more unsaturated bonds such as acrylate-based compounds.

In addition, the composition for the hard coating layer may comprise a thermosetting resin. Examples of the thermosetting resin include a phenol resin, a urea resin, a diallyl phthalate resin, a melamine resin, a guanamine resin, an unsaturated polyester resin, a polyurethane resin, an epoxy resin, an aminoalkyd resin, a melamine-urea co-condensation resin, a polysiloxane resin, and the like.

First Refractive Layer and Second Refractive Layer

The first refractive layer and the second refractive layer serve to lower the reflectance by a combination of the refractive index with the lower coating layers.

The first refractive layer may comprise a resin that contains metal oxide fine particles having a refractive index of 1.70 to 2.80.

The metal oxide fine particles may be one selected from, for example, titanium oxide ($TiO_2$), zirconium oxide ($ZrO_2$), cerium oxide ($CeO_2$), tin oxide ($SnO_2$), antimony oxide ($Sb_2O_5$), zinc antimonate ($ZnSb_2O_6$), antimony-tin oxide (ATO), indium-tin oxide (ITO), phosphorous-tin oxide (PTO), aluminum-zinc oxide (AZO), gallium-zinc oxide (GZO), and combinations thereof.

The second refractive layer may comprise any one from, for example, (i) a resin that contains inorganic fine particles of a low refractive index such as silica or magnesium fluoride, (ii) a fluorine-based resin as a low refractive index resin, (iii) a fluorine-based resin that contains inorganic fine particles of a low refractive index such as silica or magnesium fluoride, and (iv) an inorganic material of a low refractive index such as silica or magnesium fluoride. Silica is preferably hollow silica fine particles.

The fluorine-based resin may be a polymerizable compound that contains a fluorine atom at least in its molecule or a polymer therefrom. In such an event, the polymerizable compound is not particularly limited, but it preferably has a curable reactive group such as a photocurable functional group, a thermosetting polar group, and the like.

Examples of the polymerizable compound having a photocurable functional group and a thermosetting polar group include alkyl, alkenyl, and aryl esters of partially or fully fluorinated acrylic or methacrylic acid, fully or partially fluorinated vinyl ethers, fully or partially fluorinated vinyl esters, fully or partially fluorinated vinyl ketones, and the like.

As a specific example, the base layer may comprise a polyethylene terephthalate resin, the primer layer may comprise a thermosetting polyurethane resin, the hard coating layer may comprise a photocurable acrylate-based resin, the first refractive layer may comprise titanium oxide ($TiO_2$) or zirconium oxide ($ZrO_2$), and the second refractive layer may comprise silica fine particles.

Properties of the Protection Film

The protection film according to the embodiment in which the refractive indices between the constituent layers are combined has a very low reflectance to visible light, so that its visibility is not impaired by external light.

That is, the protection film may have a reflectance of 5% or less, 4% or less, 3% or less, or 2% or less, more specifically, a reflectance of 0% to 5%, 3% to 5%, or 0% to 3%, for light having a wavelength of 550 nm. Thus, the protection film has little reflection of external light, whereby the visibility can be enhanced.

Process for Preparing the Protection Film

The protection film may be prepared by a process comprising extruding a composition comprising a polyester resin to obtain an unstretched film; stretching the unstretched film in the longitudinal direction and in the transverse direction; heat-setting the stretched film to prepare a base layer; and forming one or more coating layers on the base layer.

More specifically, the protection film may be prepared by a process comprising extruding a polyester resin to obtain an unstretched sheet; preheating the unstretched sheet at 70° C. to 90° C. and then stretching it at a longitudinal stretching ratio of 2.0 to 5.0 and a transverse stretching ratio of 2.0 to 5.0; heat-setting the stretched sheet at 150° C. to 250° C. to prepare a base layer; and sequentially forming a primer layer, a hard coating layer, a first refractive layer, and a second refractive layer on the base layer.

In addition, the protection film may further comprise a coating layer having an antistatic or anti-sparkling function disposed on the primer layer as additional functional layers.

[Laminate]

Figure 3:
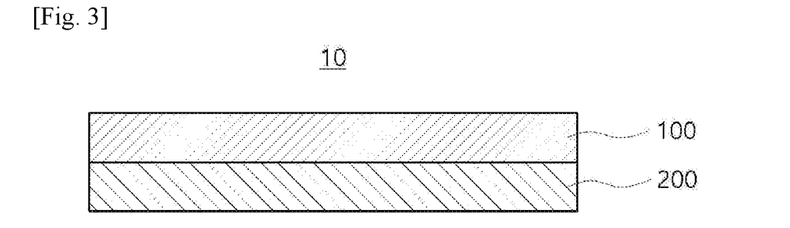
FIG. 3 shows a cross-sectional view of a laminate provided with a transparent cover for a flexible display device and a protection film.

FIG. 3 shows a cross-sectional view of a laminate provided with a transparent cover for a flexible display device and a protection film.

Referring to FIG. 3, the laminate (10) according to an embodiment comprises a transparent cover (200) for a flexible display device; and a protection film (100) comprising a base layer disposed on the transparent cover (200) and comprising a polyester resin and a primer layer disposed on the base layer.

The protection film in the laminate has substantially the same configuration and properties as those of the protection film according to the embodiment as described above.

Transparent Cover

The transparent cover may be a cover window of a flexible display device.

The transparent cover may be a polymer film or a glass substrate. Specifically, the transparent cover may be a polyimide-based film or ultra-thin glass (UTG).

As an example, the transparent cover may comprise a polyimide resin.

The transparent cover may have a surface hardness of HB or higher and a light transmittance of 80% or more at a wavelength of 550 nm. In addition, the transparent cover may have a yellow index of 5 or less and a haze of 2% or less based on a thickness of 50 μm.

The transparent cover may have a strain of 10% or more, 12% or more, 15% or more, or 20% or more, until whitening occurs. Within the above range, it can be advantageously applied to a flexible display device since no whitening occurs despite the deformation upon frequent folding. The strain refers to the ratio of a changed dimension to an initial dimension of a film. Here, the changed dimension may be an increased dimension or a decreased dimension. In particular, the protection film and the transparent cover may each have a strain of 10% or more until whitening occurs.

The transparent cover may withstand 100 times or more, 1,000 times or more, 10,000 times or more, 50,000 times or more, 100,000 times or more, 150,000 times or more, or 200,000 times or more of repeated folding at an angle of 135° until it is broken. Within the above range, it can be advantageously applied to a flexible display device since it is not broken even upon frequent folding.

The laminate, when a first direction and a second direction perpendicular to each other in the plane are defined, may satisfy the following Relationships (11) to (13) at 25° C.

$$0.7 \leq m2/m1 \leq 1.3 \quad (11)$$

$$0.5 \leq m1/m3 \leq 0.9 \quad (12)$$

$$0.4 \leq m2/m4 \leq 0.9 \quad (13)$$

In the above relationships, m1 and m2 are the moduli of the base layer in the first direction and in the second direction, respectively, and m3 and m4 are the moduli of the transparent cover in the first direction and in the second direction, respectively.

In addition, the transparent cover has a low level of moduli (m3, m4) in the first direction and in the second direction perpendicular to each other in the plane at 25° C.

In particular, the transparent cover has a small difference between m3 and m4 of the film (|m3− m4|) at 25° C. That is, the m4/m3 ratio may be close to 1 at 25° C.

As such, the transparent cover can be advantageously applied to a flexible display device since neither whitening nor cracks occur despite frequent bending or folding.

Both m3 and m4 may be 10 GPa or less, 9.5 GPa or less, 9 GPa or less, 8.5 GPa or less, or 8 GPa or less at 25° C. Specifically, both m3 and m4 may be 5 GPa to 10 GPa, 5 GPa to 9.5 GPa, 5 GPa to 8.5 GPa, or 5 GPa to 8 GPa at 25° C.

In addition, the difference between m3 and m4 (|m3−m4|) may be 2.0 GPa or less at 25° C. Specifically, the difference between m3 and m4 (|m3−m4|) may be 1.5 GPa or less, 1.0 GPa or less, 0.5 GPa or less, 0.2 GPa or less, or 0.1 GPa or less at 25° C.

In addition, the m4/m3 ratio may be 0.7 to 1.3, 0.8 to 1.2, or 0.9 to 1.1 at 25° C.

As an example, the first direction may be the transverse direction (TD) of the film, and the second direction may be the longitudinal direction (MD) of the film.

In such an event, the m4/m3 ratio may be 0.7 to 1.0, 0.8 to 1.0, 0.9 to 1.0, 0.7 to 0.9, 0.7 to 0.8, or 0.8 to 0.9 at 25° C.

Alternatively, the m4/m3 ratio may be 1.0 to 1.3, 1.0 to 1.2, 1.0 to 1.1, 1.1 to 1.3, 1.2 to 1.3, or 1.1 to 1.2 at 25° C.

In addition, the moduli (m1, m2) of the protection film in the first direction and in the second direction and the moduli (m3, m4) of the transparent cover in the first direction and in the second direction satisfy the above Relationships (12) and (13).

Specifically, the m1/m3 ratio may be 0.5 to 0.9, 0.5 to 0.8, 0.5 to 0.7, 0.6 to 0.9, 0.7 to 0.9, or 0.6 to 0.8.

In addition, the m2/m4 ratio may be 0.4 to 0.9, 0.4 to 0.8, 0.4 to 0.7, 0.5 to 0.9, 0.6 to 0.9, or 0.5 to 0.8.

In addition, m1 and m2 may be 2.5 GPa to 5 GPa at 25° C., respectively, and m3 and m4 may be 5 GPa to 10 GPa at 25° C., respectively.

The laminate can be applied to a cover of a flexible display device, in particular, a foldable display device by virtue of these characteristics. It is possible to prevent a deterioration in the characteristics by the deformation occurring at the point of small inward folding in an in-folding type, as well as by the deformation occurring at the point of large outward folding in an out-folding type.

Additional Functional Layers

The laminate (20) may further comprise one or more functional coating layers formed between the protection film (100) and the transparent cover (200).

For example, the one or more functional coating layers may be a layer for enhancing the adhesion between the protection film and the transparent cover.

[Display Device]

The display device according to an embodiment comprises a display panel; and a protection film according to the embodiment disposed on one side of the display panel.

The display device according to another embodiment comprises a display panel; and a laminate according to the embodiment disposed on one side of the display panel.

The display device may be a flexible displace device, in particular, a foldable display device.

Specifically, the foldable display device may be an in-folding type or an out-folding type depending on the folding direction.

The protection film or the laminate in the displace device has substantially the same configuration and properties as those of the protection film or the laminate according to the embodiments as described above.

Specifically, since the protection film or the laminate has a small difference between the moduli in two directions perpendicular to each other in the plane, the whitening phenomenon can be remarkably suppressed even upon frequently folding. In addition, since the protection film or the laminate is excellent in other mechanical properties, thermal properties, and durability, it can serve as a protection film to mitigate impact, prevent scattering, and prevent scratches.

Mode for the Invention

Hereinafter, the present invention will be described in detail with reference to Examples. But the following examples are intended to illustrate the present invention, and the scope of the present invention is not limited thereto only.

Preparation and Evaluation of Polyester Films (Examples A1 to A4, and Comparative Examples A1 and A2)

A polyethylene terephthalate (PET) resin (SKC) was extruded by an extruder and cast onto a casting roll to prepare an unstretched sheet. The unstretched sheet was stretched in the longitudinal direction (MD) and the transverse direction (TD). Thereafter, the stretched sheet was heat set, annealed, and cooled to prepare a polyester film. Here, relaxation was performed in two stages while the temperature in the annealing step was lowered.

Specific process conditions are summarized in Table 1 below.

TABLE 1

|  | Raw material | Thickness (μm) | Preheating temp. (° C.) | MD Stretching ratio | TD Stretching ratio | Heat setting temp. (° C.) |
| --- | --- | --- | --- | --- | --- | --- |
| Ex. A1 | PET | 40 | 78 | 3.3 | 3.5 | 180 |
| Ex. A2 | PET | 40 | 78 | 3.1 | 3.4 | 230 |
| Ex. A3 | PET | 50 | 78 | 3.1 | 3.4 | 230 |
| Ex. A4 | PET | 30 | 78 | 3.1 | 3.4 | 230 |
| C. Ex. A1 | PET | 50 | 78 | 3.2 | 4.2 | 230 |
| C. Ex. A2 | PET | 80 | 78 | 1.2 | 4.3 | 210 |

The polyester films obtained above were tested, as follows. The results are shown in Table 2 below.

(1) Measurement of Modulus

The Young's modulus was measured at 25° C. and 85° C., respectively, in the MD and TD directions of the film samples. The results are shown in Table 2 below. Specifically, the film sample was cut to 1.5 cm in width and mounted on a universal test machine (UTM, 5566A, Instron), and the stress was measured while the length was increased to obtain the modulus.

(2) MIT Folding Test

The film samples were each subjected to the MIT folding test according to ASTM D 2176 and TAPPI T 511 using a folding endurance tester (MIT-DA, Toyoseiki). Specifically, the MIT folding test was carried out under the conditions of a folding angle of 135°, a sample size of 10 mm in width, a load of 500 gf, a radius of curvature of 0.38 R, and a folding speed of 175 times/min. The results were classified according to the following criteria and shown in Table 2 below.
  ○: The number of repeated folding was 100,000 times or more until cracks or fractures occurred.
  x: The number of repeated folding was less than 100,000 times until cracks or fractures occurred.

(3) Crack Strain Test

The film samples were each measured for the minimum elongation rate until whitening occurred using a universal test machine (UTM, 5566A, Instron) while it was stretched by 1%. The results were classified according to the following criteria and shown in Table 2 below.
  ○: No whitening occurred even at an elongation of 10% or more.
  x: Whitening occurred at an elongation of less than 10%.

TABLE 2

|  | MD modulus (GPa)/TD modulus (GPa) (measured at 25° C.) | MD modulus (GPa)/TD modulus (GPa) (measured at 85° C.) | Folding test | Whitening test |
|---|---|---|---|---|
| Ex. A1 | 3.7/3.8 | 1.57/1.9 | ○ | ○ |
| Ex. A2 | 3.7/4.0 | 1.5/1.62 | ○ | ○ |
| Ex. A3 | 3.8/3.9 | 1.95/2.1 | ○ | ○ |
| Ex. A4 | 4.0/4.1 | 1.62/1.675 | ○ | ○ |
| C. Ex. A1 | 3.8/4.6 | 2.3/2.87 | x | x |
| C. Ex. A2 | 2.2/5.8 | 1.5/3.2 | x | x |

As shown in Table 2 above, since the polyester films of Examples A1 to A4, in which the MD modulus and the TD modulus were adjusted to preferred ranges, passed both the folding test and the whitening test, they were suitable as a protection film for a cover of a flexible display device.

In contrast, since the polyester films of Comparative Examples A1 and A2, in which the MD modulus and the TD modulus were outside the preferred ranges, did not pass the folding test and the whitening test, they were not suitable as a protection film for a cover of a flexible display device.

Preparation and evaluation of protection films (Examples B1 to B6, and Comparative Examples B1 and B2)

A polyethylene terephthalate (PET) resin (SKC) was extruded by an extruder and cast onto a casting roll to prepare an unstretched sheet. The unstretched sheet was stretched in the longitudinal direction (MD), and a primer layer was formed on the unstretched sheet. Here, a thermosetting polyurethane resin composition was coated using a Meyer bar and dried to form a primer layer.

Thereafter, it was stretched in the transverse direction (TD), and the stretched sheet was heat set, annealed, and cooled to prepare a polyester film. Here, relaxation was performed in two stages while the temperature in the annealing step was lowered.

Specific process conditions are summarized in Table 3 below.

TABLE 3

|  | Thickness (μm) | Preheating temp. (° C.) | MD Stretching ratio | TD Stretching ratio | Heat setting temp. (° C.) |
|---|---|---|---|---|---|
| Ex. B1 | 42 | 82 | 3.2 | 3.45 | 190 |
| Ex. B2 | 35 | 82 | 3.3 | 5.56 | 185 |
| Ex. B3 | 38 | 82 | 3.35 | 3.6 | 185 |
| Ex. B4 | 32 | 82 | 3.4 | 3.65 | 185 |
| Ex. B5 | 48 | 83 | 3.3 | 3.55 | 195 |
| Ex. B6 | 46 | 82 | 3.4 | 3.63 | 200 |
| C. Ex. B1 | 32 | 82 | 3.5 | 3.78 | 190 |
| C. Ex. B2 | 56 | 85 | 3.3 | 3.85 | 210 |

The protection films thus prepared were tested, as follows.

(1) Refractive Index and In-Plane Retardation

The refractive index ((nx+ny)/2), the in-plane retardation (Ro), the thickness direction retardation (Rth), and the in-plane retardation (|ΔRo|/|Δx|) within the effective width were measured for the film samples.

First, the orientation axis direction of the film sample was obtained with two polarizing plates. The sample was cut into a rectangle of 4 cm×2 cm such that the orientation axis directions were orthogonal. The in-plane retardation (Ro) and the thickness direction retardation (Rth) were measured at the width center using a phase difference meter (Axoscan, Axometrics, measurement wavelength: 550 nm). In addition, the refractive index as a basic data of the retardation meter was measured by Abbe refractometer (NAR-4T, Atago Co., Ltd., measurement wavelength: 589.3 nm) at room temperature; and the thickness d (μun) was measured with an electronic micrometer (Millitron 1245D, Feinpruf GmbH).

(2) Total Transmittance

The total transmittance and haze were measured using a haze measuring instrument (NDH-5000W, Nippon Denkoku Kogyo).

(3) Interference Stains

A black tape was attached to the rear side of the film sample, which was then observed with the naked eye to check whether interference stains occurred.

No: No rainbow stains and colors were observed in any direction.

Slightly visible: Slight interference stains were observed in some directions.

Strongly visible: Strong interference stains were observed.

TABLE 4

| | In-plane retardation of base layer (nm) | Thickness of primer layer (nm) | Total transmittance (%) | Ratio of refractive indices of primer layer to base layer | Interference stria |
|---|---|---|---|---|---|
| Ex. B1 | 350 | 80 | 92.5 | 0.89 | No |
| Ex. B2 | 268 | 40 | 92.8 | 0.95 | No |
| Ex. B3 | 289 | 85 | 93.8 | 0.92 | No |
| Ex. B4 | 148 | 100 | 92.1 | 0.98 | No |
| Ex. B5 | 541 | 28 | 93.0 | 0.97 | No |
| Ex. B6 | 489 | 48 | 93.7 | 0.89 | No |
| C. Ex. B1 | 156 | 54 | 91.2 | 0.74 | Strongly visible |
| C. Ex. B2 | 652 | 26 | 92.4 | 1.0 | Slightly visible |

As shown in Table 4 above, the protection films according to the Examples had excellent transmittance, and no interference stains were observed. In contrast, the protection films according to the Comparative Examples showed interference stains.

Preparation and Evaluation of Protection Films (Example C1)

Step (1): Formation of a Primer Layer

A primer layer was formed on the polyester base layer of Example A1 under the process conditions of Example B3.

Step (2): Formation of a Hard Coating Layer

Pentaerythritol triacrylate (PETA) was dissolved in a methyl isobutyl ketone (MIBK) solvent at a concentration of 30% by weight, followed by the addition thereto of a photoinitiator (Irg184, BASF) at a concentration of 5% by weight based on the solids content, thereby preparing a composition for a hard coating layer. The composition for a hard coating layer was coated on the primer layer by a bar coater to form a coating layer such that the layer thickness after drying was 5 The coating film thus formed was dried at 80° C. for 1 minute to remove the solvent and set by ultraviolet irradiation at about 300 mJ/cm$^2$ to form a hard coating layer.

Step (3): Formation of a First Refractive Layer

A first refractive layer was formed on the hard coating layer from a composition that contained a multifunctional acrylate resin and titanium oxide (TiO$_2$). After the composition was coated on the hard coating layer, it was dried at 80° C. for 1 minute and irradiated with ultraviolet rays at about 650 mJ/cm$^2$ under the nitrogen purging condition to form a first refractive layer. Here, the composition had about 40% by weight of a solids content and had a viscosity of about 6.5 mPa·s at 25° C.

Step (4): Formation of a Second Refractive Layer

A second refractive layer was formed on the first refractive layer from a resin that contained silica fine particles.

The refractive index and thickness of each layer of the protection films (Example C1) thus prepared are summarized in Table 5 below.

TABLE 5

| | Refractive index | Thickness |
|---|---|---|
| Base layer | 1.66 | 40 μm |
| Primer layer | 1.60 | 85 nm |
| Hard coating layer | 1.52 | 2.5 μm |
| First refractive layer | 1.75 | 60 nm |
| Second refractive layer | 1.29 | 100 nm |

The protection films thus prepared were tested, as follows.

(1) Measurement of Reflectance

The reflectance of the protection film prepared in Example C1 was measured.

A black adhesive tape (Nitto) was attached to a glass having little light absorption, and the optical multilayer film specimen was attached thereon. The reflectance was measured using a spectrophotometer (U-4100, Hitachi, Ltd.).

As a result, the reflectance for light having a wavelength of 550 nm was measured to be 5% or less.

Preparation and Evaluation of Laminates

A primer layer was formed on the polyester films of Examples A1 to A4 and Comparative Examples A1 and A2 in the same manner as above to obtain a protection film, respectively.

The protection film thus prepared was laminated with a polyimide film (TPI, SKC) through an optically transparent adhesive (OCA 8146-x, 3M) to prepare a laminate. Here, the modulus of the polyimide film was about 6.5 GPa in the MD and TD directions at about 25° C., respectively.

In addition, the laminates were each subjected to the folding evaluation and whitening evaluation in the same manner as above. As a result, the laminates comprising each of the polyester films of Examples A1 to A4 passed the folding test and whitening test. In contrast, the laminates comprising each of the polyester films of Comparative Examples A1 and A2 did not pass the folding test and whitening test.

The invention claimed is:

1. A laminate, which comprises a transparent cover for a flexible display device; and a protection film comprising a base layer disposed on the transparent cover and comprising a polyester resin; and a primer layer disposed on the base layer, wherein the protection film has a reflectance of 5% or less for light having a wavelength of 550 nm, the strain until whitening occurs in the transparent cover and the base layer is 10% or more, and the following Relationship (1) is satisfied:

$$0.7 \leq n2/n1 \leq 1.0 \qquad (1)$$

in the above relationship, n1 and n2 refer to the refractive indices of the base layer and the primer layer, respectively, when a first direction and a second direction perpendicular to each other in the plane are defined, satisfies the following Relationships (11) to (13) at 25° C.:

$$0.7 \leq m2/m1 \leq 1.3 \qquad (11)$$

$$0.5 \leq m1/m3 \leq 0.9 \qquad (12)$$

$$0.4 \leq m2/m4 \leq 0.9 \qquad (13)$$

in the above relationships, m1 and m2 are the moduli of the base layer in the first direction and in the second direction, respectively, and m3 and m4 are the moduli of the transparent cover in the first direction and in the second direction, respectively.

2. The laminate of claim 1, wherein the base layer, when a first direction and a second direction perpendicular to each other in the plane are defined, has a ratio (m2/m1) of the modulus (m2) in the second direction to the modulus (m1) in the first direction of 0.7 to 1.3 at 25° C., withstands 100 times or more of repeated folding at an angle of 135° until it is broken, and has an in-plane retardation (Ro) of 600 nm or less and a thickness direction retardation (Rth) of 4,000 nm or more.

3. The laminate of claim 2, wherein both m1 and m2 are 4.5 GPa or less at 25° C.

4. The laminate of claim 1, which further satisfies the following Relationship (2):

$$0 \leq n1-n2 \leq 0.10 \quad (2)$$

in the above relationship, n1 and n2 refer to the refractive indices of the base layer and the primer layer, respectively.

5. The laminate of claim 1, which further comprises a hard coating layer disposed on the primer layer and further satisfies the following Relationships (3) to (5):

$$n3 < n2 < n1 \quad (3)$$

$$0.05 \leq n1-n3 < 0.20 \quad (4)$$

$$0 < n2-n3 \leq 0.13 \quad (5)$$

in the above relationships, n1, n2, and n3 refer to the refractive indices of the base layer, the primer layer, and the hard coating layer, respectively.

6. The laminate of claim 5, wherein the base layer has a refractive index (n1) of 1.61 to 1.69 and a thickness of 20 μm to 60 μm, the primer layer has a refractive index (n2) of 1.54 to 1.63 and a thickness of 20 nm to 120 nm, and the hard coating layer has a refractive index (n3) of 1.50 to 1.53 and a thickness of 1 μm to 5 μm.

7. The laminate of claim 5, which further comprises a first refractive layer disposed on the hard coating layer and a second refractive layer disposed on the first refractive layer and further satisfies the following Relationships (6) and (7):

$$n5 < n3 < n2 < n1 < n4 \quad (6)$$

$$0.25 \leq n4-n5 \leq 0.60 \quad (7)$$

in the above relationships, n1, n2, n3, n4, and n5 refer to the refractive indices of the base layer, the primer layer, the hard coating layer, the first refractive layer, and the second refractive layer, respectively.

8. The laminate of claim 7, wherein the base layer has a refractive index (n1) of 1.61 to 1.69 and a thickness of 20 μm to 60 μm, the primer layer has a refractive index (n2) of 1.54 to 1.63 and a thickness of 20 nm to 120 nm, the hard coating layer has a refractive index (n3) of 1.50 to 1.53 and a thickness of 1 μm to 5 μm, the first refractive layer has a refractive index (n4) of 1.60 to 1.75 and a thickness of 60 nm to 800 nm, and the second refractive layer has a refractive index (n5) of 1.25 to 1.35 and a thickness of 80 nm to 120 nm.

* * * * *